Patented Nov. 5, 1935

2,019,626

UNITED STATES PATENT OFFICE 2,019,626

COLORATION OF TEXTILE MATERIALS

Henry Charles Olpin and George Holland Ellis, Spondon, near Derby, England, assignors to Celanese Corporation of America, a corporation of Delaware No Drawing. Application May 23, 1933, Serial No. 672,446. In Great Britain June 9, 1932

8 Claims. (Cl. 8—5)

This invention relates to the coloration of materials and more particularly to the production of colorations on materials made of or containing organic derivatives of cellulose.

In U. S. Patent No. 1,854,460 there is broadly described the dyeing of cellulose ester or ether materials with compounds in which an aryl dye nucleus (other than an azo dye nucleus) contains in the nucleus or as substituents one or more amino or imino groups, one or more hydrogen atoms of which are replaced by an aliphatic side chain containing one, two, three or more hydroxy groups. Again, in U. S. Patent No. 1,854,461 compounds of the similar type to those in the above mentioned specification but in which the aliphatic side chain containing one, two, three or more hydroxy groups is linked to the aryl nucleus through oxygen or sulphur are described for dyeing cellulose ester and ether materials.

It has now been found that valuable colorations may be produced on materials made of or containing organic derivatives of cellulose with the aid of compounds containing one or more aryl residues or aromatic nuclei and at least one nitro group, at least one hydroxylated aliphatic group, united to an aryl nucleus through nitrogen, and more particularly with the aid of compounds of the above mentioned character in which the sole chromophoric groupings are the nitro groups. Especially valuable are compounds containing nitro groups and hydroxyalkylamino groups but no further chromophoric groups.

Thus for example dyeings may be produced on cellulose ester and ether materials by means of nitro-ethanolamino-benzenes, toluenes or naphthalenes, e. g. 4-chlor-2-nitro-1-ethanolamino-benzene or 2:4-dinitro-1-ethanolamino-benzene.

The invention is not, however, restricted to the use of such simple compounds in the production of colorations on cellulose ester and ether materials. Thus for example, the compounds may contain two or more aryl nuclei linked together either directly as in the case of diphenyl or other diaryl compounds or indirectly, for example, through oxygen, sulphur, —NH—, —CH$_2$—, —CO—, —CO.NH— or other atom or group, as for example in 2:4-dinitro-4'-ethanolamine diphenylamine. Especial mention may be made of diaryl compounds containing a nitro group and an hydroxyalkylamino group in the same nucleus, for example 3-nitro-4-hydroxy-ethylamino-diphenyl or the 1-benzoyl-amino-3-hydroxy-ethylamino-4-nitro benzene obtainable for instance by benzoylating nitro-m-phenylene-diamine and oxyethylating the product.

Other compounds which may be used in accordance with the invention are nitro-anthraquinone derivatives containing aliphatically linked hydroxyl groups, and particularly hydroxyalkyl-amino groups, for example, 1-nitro-4-hydroxyalkyl-amino-anthraquinones or the corresponding 1:5- or 1:8-bodies.

The invention is not limited to compounds in which nitro groups are the sole chromophores, as if desired other chromophoric groupings may be present.

Aliphatic radicles bearing the aliphatically linked hydroxyl group characteristic of the compounds of the invention may be linked with the aryl nuclei in a variety of ways. Thus for example not only may they be linked through nitrogen, as in the case of the above mentioned hydroxyalkylamino compounds, but also through oxygen, as in the case of hydroxyalkylethers or through sulphur as in the case of hydroxyalkyl-thioethers, or even directly. Further the compounds may contain two or more aliphatically linked hydroxyl groups, which groups may be linked to the same or separate aliphatic residues. Again two hydroxyalkyl residues may be united to the aryl nuclei through the same atom, as for example in the case of di-(hydroxyalkyl)-amino-aryl compounds. If desired the aliphatic residues may contain carboxylic groups or other substituents in addition to the hydroxyl group or groups.

The compounds of the present invention may contain, in addition to the nitro and aliphatically linked hydroxyl groups, any other desired substituents. Thus for example they may contain halogen, alkyl, alkoxyl, amino or acidyl-amino groups. Where the compound is a nitro hydroxyalkylamino compound the amino group of the latter may be substituted by alkyl or aryl groups which may themselves be substituted. Preferably the compounds should contain at least one amino group which is not acylated. Where the hydroxylated aliphatic grouping is not itself an auxochrome, an auxochromic grouping should of course be present.

The dyestuffs employed in accordance with the present invention are new and are included in the scope of the invention. They may be obtained by the replacement by, or conversion into, a hydroxylated aliphatic group or a residue carrying such a group, of a replaceable or convertible atom or group in an aromatic compound containing a nitro group or groups which are preferably the sole chromophores, or by the replacement by, or conversion into, a nitro group or a residue carrying such a group, of a replaceable or convertible atom or group in an aromatic compound containing a hydroxylated aliphatic group. The preparation of the dyestuffs may thus be carried out in a variety of ways. Thus halogen atoms or nitro, hydroxy or alkyloxy or other ether groups may be replaced by the action of hydroxyalkylamines, e. g. ethanolamine, or hydroxy-alkyl-mercaptans or di- or polyhydroxy compounds. For example 2:4-dinitro-1-ethanolaminobenzene may be obtained by action of ethanolamine on 2:4-dinitro-chlorbenzene and 4-chlor-2-nitro-1-ethanolamino benzene in a similar manner from 2:5-dichlornitrobenzene.

Again the dyestuffs may be produced by introducing a hydroxy-aliphatic residue into an amino-, hydroxy-, or mercapto-compound of appropriate configuration. Such introduction may be effected for instance by the action of chlorhydrins, e. g. ethylene-, propylene-, or glycerine-chlorhydrins, or by the action of other hydroxyalkylating agents, for example alkylene oxides, e. g. ethylene oxide or epichlorhydrin. Thus 3-nitro-4-amino diphenyl may be hydroxyethylated.

Though the above are in general the most convenient methods of producing the dyestuffs, other methods may be employed. Thus nitro groups may be directly introduced into compounds containing the desired aryl nuclei and aliphatically linked hydroxyl groups. Again in the case of polyaryl compounds nuclei containing the requisite nitro and aliphatically linked hydroxyl groups may be united by appropriate reactions; for example, a nitro-oxyethyl-paraphenylenediamine may be benzoylated or oxyethyl-paraphenylenediamine may be nitrobenzoylated.

The dyestuffs of the present invention, which are preferably unsulphonated, may be applied to the materials by any desired means. The hydroxy group tends to impart to the dyestuffs solubility in water, and in the case of compounds of relatively simple constitution, such for example as 4-chlor-2-nitro-1-ethanolamino benzene and 2:4-dinitro-1-ethanolamino benzene, to a sufficient extent to enable them to be applied from aqueous solution. Where solubility in water is insufficient the dyestuffs may conveniently be applied to cellulose derivative materials in the form of dispersions prepared for example with the aid of one or more of the dispersing agents of U. S. Patents Nos. 1,618,413, 1,618,414, 1,694,413, 1,690,481, 1,803,008, 1,840,572, 1,716,721 and 1,928,647 and British Patent No. 323,788, and the compositions containing these dyestuffs and these or other dispersing agents and/or protective colloids and any other ingredients form an important feature of the present invention. If desired more or less concentrated preparations may be made up containing the dyestuffs, dispersing agents and/or protective colloids and any other desired ingredients, which preparations may be diluted when required for use.

The dyestuffs of the present invention may be applied to the goods by any desired method, for example by immersion processes or by mechanical impregnation, or by printing, or stencilling. For printing, the dyestuff preparations may be mixed with a thickening agent such for example as gum arabic, dextrin, or the like, and the resultant paste applied by a convenient method of local application, for example by printing with engraved rollers or through stencils, and the prints afterwards dried, steamed and aged and finished as desired or requisite.

The dyestuffs may be employed in conjunction with any other dyestuffs or coloring matters and any other substances according to the particular effects to be obtained. Furthermore, they may be applied not only to the production of colorations on goods made of or containing cellulose acetate, formate, propionate, butyrate, or other cellulose ester, for example the materials known under the name "immunized cotton" prepared by the action of toluene sulpho chloride on alkalized cotton, or cellulose ethers, such for example as ethyl, or benzyl cellulose, but they may be applied in the production of colorations on materials containing the cellulose esters or ethers in admixture with each other and/or with animal or vegetable fibres, and in the production of colorations on textile materials in general.

The following examples illustrate the production and use of the new dyestuffs of the present invention.

Example 1

19.2 parts of 2:5-dichlor-nitro-benzene and 7 parts of mono-ethanolamine are heated slowly to 200° C. and maintained at that temperature for a short time before being allowed to cool. The product is extracted with methylated spirits and recrystallized from hot water, when 4-chlor-2-nitro-1-ethanolamino-benzene is obtained in the form of yellow crystals.

Example 2

10 parts of 2:4-dinitro-chlor-benzene are stirred with 30 parts of ethanolamine and heated to 100° to 120° C. After being maintained at this temperature for about 1 hour the molten mass is allowed to cool and is then boiled with water. Undissolved oily matter is separated by decantation from the aqueous solution from which 2:4-dinitro-1-ethanolamino-benzene crystallizes on cooling as a golden yellow magma.

Example 3

10 kilos of a well scoured cellulose acetate woven fabric are wetted out and immersed in a dyebath at 80° C. containing 100 grams of 2:4-dinitro-1-ethanolamino-benzene dissolved in 300 litres of water and dyeing continued for 1½ hours at about the same temperature. The fabric is then washed and dried or otherwise treated as desired, a level bright yellow shade being obtained.

Example 4

10 kilos of cellulose acetate yarn in hank form are entered into a dyebath at 80° C. containing 100 grams of 4-chlor-2-nitro-1-ethanolamino-benzene dissolved in 300 litres of water. Dyeing is continued at 80° with continuous or periodic turning till the requisite golden yellow shade is achieved, when the goods are lifted, rinsed and dried or otherwise treated as desired.

Example 5

1 kilogram of a paste consisting of 1 part of finely divided 2:4-dinitro-4'-ethanolamino-diphenylamine (obtainable for example by hydroxyethylating 2:4-dinitro-4'-amino-diphenyl-amine for example with ethylene oxide or ethylene chlorhydrin) 6 parts of water and 3 parts of Turkey red oil (50%) is heated to 70–75° C. with 10 litres of 2.5 grams per litre soap solution, the mixture being well stirred. The mixture is then strained through a filter cloth into a dyebath containing 300 litres of 2.5 grams per litre soap solution.

To dye a cellulose acetate fabric in a golden orange shade the scoured fabric is entered in rope form into the above dyebath, dyeing being commenced in the cold or at lukewarm temperatures and the temperature slowly raised to 75° C. and maintained thereabouts for 1½ hours or until the requisite shade is achieved. The goods are now washed off thoroughly and dried or otherwise treated as may be desired.

What we claim and desire to secure by Letters Patent is:—

1. Process for the coloration of organic derivatives of cellulose, which comprises applying thereto aromatic compounds, free from azo groups, containing nuclear nitro groups as the sole chromophoric grouping, which compounds contain a wholly aliphatic group having a hydroxyl group as a substituent, said aliphatic group being linked to an aryl nucleus through nitrogen.

2. Process for the coloration of cellulose acetate, which comprises applying thereto aromatic compounds, free from azo groups, containing nuclear nitro groups as the sole chromophoric grouping, which compounds contain a wholly aliphatic group having a hydroxyl group as a substituent, said aliphatic group being linked to an aryl nucleus through nitrogen.

3. Process for the coloration of textile materials containing organic derivatives of cellulose which comprises applying to the materials aromatic compounds free from azo groups and containing as the sole chromophoric groupings nuclear nitro groups and containing in addition hydroxyalkylamino groups.

4. Process for the coloration of textile materials containing cellulose acetate which comprises applying to the materials aromatic compounds free from azo groups and containing as the sole chromophoric groupings nuclear nitro groups and containing in addition hydroxyalkylamino groups.

5. Process for the coloration of cellulose acetate, which comprises applying thereto aromatic compounds, free from azo groups, containing two aryl nuclei directly linked together, said compounds containing hydroxyalkylamino groups and containing nitro groups as the sole chromophoric groupings.

6. Process for the coloration of cellulose acetate, which comprises applying thereto 4-chlor-2-nitro-1-ethanolamino benzene.

7. Process for the coloration of cellulose acetate, which comprises applying thereto 3-nitro-4-hydroxyethylamino-diphenyl.

8. Process for the coloration of cellulose acetate, which comprises applying thereto 1-benzoylamino-3-hydroxyethylamino - 4 - nitro - benzene.

HENRY CHARLES OLPIN.
GEORGE HOLLAND ELLIS.

CERTIFICATE OF CORRECTION.

November 5, 1935.

Patent No. 2,019,626.

HENRY CHARLES OLPIN, ET AL.

It is hereby certified that error appears in the printed specification of the above numbered patent requiring correction as follows: Page 2, first column, lines 34 and 35, for "oxyethyl" read hydroxyethyl; and that the said Letters Patent should be read with this correction therein that the same may conform to the record of the case in the Patent Office.

Signed and sealed this 10th day of December, A. D. 1935.

Leslie Frazer

Acting Commissioner of Patents.

(Seal)